United States Patent Office 3,681,076
Patented Aug. 1, 1972

3,681,076
PHOTOGRAPHIC SILVER HALIDE EMULSIONS CONTAINING COUPLERS WITH FLUORO-ALIPHATICSULFONYLOXY GROUPS
Ivan H. Skoog, St. Paul, Minn., assignor to Minnesota Mining and Manufacturing Company, St. Paul, Minn.
No Drawing. Filed June 10, 1970, Ser. No. 45,203
Int. Cl. G03c 1/40
U.S. Cl. 96—100          8 Claims

ABSTRACT OF THE DISCLOSURE

A coupler of the formula

R—X wherein R is an organic coupling radical and wherein X is a fluoroaliphaticsulfonyloxy group which is bonded to an aromatic ring of the R group.

---

This invention relates to the field of photography, and particularly to novel coupler compounds for producing colored images.

The use of photographic couplers to provide colored photographic images is well known to those skilled in the photographic art. Couplers ordinarily are incorporated in photographic emulsion layers or in developer solutions, and form dyes by reacting with an oxidation product of a primary aromatic amine photographic developer.

The present invention relates to couplers which have bonded to an aromatic carbon atom thereof a fluoroaliphaticsulfonyloxy group of at least three carbon atoms. The couplers of the invention have been found to possess valuable heat-resistance and hydrolytic stability, and excellent resistance to diffusion (migration) when incorporated in silver halide emulsions which include a hydrophilic colloidal binder such as gelatin or synthetic polymeric materials. In comparison with couplers having alkylsulfonyloxy or arylsulfonyloxy substituents (e.g., U.S. Pat. 2,289,804) or having perfluoroalkylcarbonamido substituents (e.g., U.S. Pat. 2,895,826), couplers of the present invention which include fluoroaliphaticsulfonyloxy groups offer considerably greater resistance to diffusion.

Briefly, the color couplers of the present invention are characterized by the formula

R—X wherein R is an organic coupler radical which includes at least one aromatic ring and an active coupling function which is reactive with the oxidation product of a primary aromatic amine developer, and wherein X represents a fluoroaliphaticsulfonyloxy group which includes at least three carbon atoms and which is bonded to an annular carbon atom of an aromatic ring of the R radical in a non-coupling position.

The R radical is chosen such that the compound RH (wherein a hydrogen atom replaces the fluoroaliphaticsulfonyloxy group) is a coupler; i.e., is capable of reacting with the oxidation product of a primary aromatic amine developer, such as N,N-diethyl-p-phenylenediamine, to form a dye. As such, the R radicals of the invention include those radicals known to the art and generally employed in couplers of, for example, the phenolic, 1-naphtholic, 5-pyrazolone and benzoylacetamide types. Such couplers have coupling functions of the methylene or methine (i.e., methylidyne) types, and may be of the two-equivalent type as described, for example, in U.S. Pats. 2,728,658; 3,006,759; etc.

The fluoroaliphatic radical is a fluorinated, saturated, monovalent, non-aromatic radical, the aliphatic portion of which may be straight, branched, or cyclic, and may include oxygen atoms or trivalent nitrogen atoms bonded only to carbon atoms. The fluoroaliphatic radical must contain at least three carbon atoms. The radical preferably contains at least a terminal perfluoromethyl group and most preferably is fully fluorinated, although substituent atoms such as hydrogen or chlorine may be present provided that the ratio of substituent atoms to carbon atoms does not exceed 1:2. The fluoroaliphatic radical preferably contains not more than 20 carbon atoms, and most preferably contains not more than 8 carbon atoms, thereby promoting ease of preparation and providing efficient utilization of fluorine. Of these, those couplers wherein X is a $C_4$–$C_8$ perfluoroalkyl group have given exceptionally satisfactory results.

The couplers of the present invention may for the most part be prepared from aminoaryl fluoroaliphaticsulfonate compounds by reaction through the amino group thereof. The aminoaryl fluoroaliphaticsulfonate precursor compounds, which do not form a part of this invention, may generally be prepared by reacting a hydroxy-substituted aminoaryl compound with a blocking group such as benzaldehyde to block the amino group, and thereafter reacting the resulting compound through the hydroxyl group with a fluoroaliphaticsulfonyl halide. Removal of the blocking group yields the aminoaryl fluoroaliphaticsulfonate. Blocking techniques, such as those used in peptide synthesis, are well known to the art, and blocking agents which may be used, in addition to benzaldehyde, include benzylchloroformate, dicyclohexylcarbodiimide, trichloroethylchloroformate, etc.

Another method of preparing aminoaryl fluoroaliphaticsulfonate intermediates involves reacting an aryl compound having both hydroxy and nitro substituents with a fluoroaliphaticsulfonyl halide to form the nitro-substituted aryl fluoroaliphaticsulfonate ester, followed by reduction to form the corresponding amine.

Perhaps the easiest route for preparing the aminoaryl intermediate compounds involves the direct reaction between a fluoroaliphaticsulfonyl halide and a hydroxy-substituted aryl amine wherein the amine and hydroxy groups are respectively bonded to annular carbon atoms of the aryl group which are connected by an odd number of annular carbon atoms. The simplest member of this group is m-aminophenol, and color couplers prepared from the corresponding 3 - aminophenyl fluoroaliphaticsulfonate represent a preferred class of couplers of the invention because of their ease of preparation.

Aminoaryl fluoroaliphaticsulfonate intermediates may be directly reacted with various preselected amine-reactive compounds to form couplers. For example, 3-aminophenyl perfluorobutanesulfonate may be reacted with an ester such as ethyl benzoylacetate in xylene to form the corresponding amide (3' (2''-benzoylacetamido) phenyl perfluorobutanesulfonate) coupler. Various other methods of preparing compounds of the present invention are within the skill of those familiar with the coupler art. For ease of preparation, however, couplers have fluoroaliphaticsulfonyloxyarylamino (e.g., fluoroaliphaticsulfonyloxyanilino) moieties are preferred; i.e., R in the above formula preferably includes an arylamino radical, X being bonded to the aryl portion thereof.

The couplers of the present invention may be incorporated into silver halide photographic emulsion by methods known to the art. One such method involves dispersing a solution of the coupler in a high-boiling, water-immiscible solvent such as dibutylphthalate in a silver halide emulsion which contains a hydrophilic colloidal binder such as gelatin, polyvinylalcohol, and the like. The nature of the photographic emulsions which are employed is not critical to the present invention, and silver halide emulsions can be utilized which contain, among other photographic adjuvants, synthetic hydrophilic colloidal binders, sensitizers, coating aids, stabilizers, hardeners, and the like.

The following compounds are representative of couplers of the present invention:

I 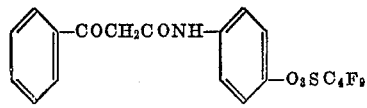

II 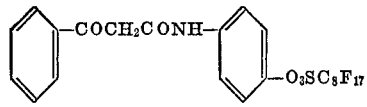

III 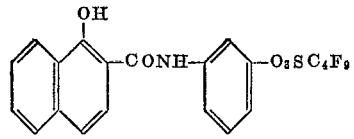

IV 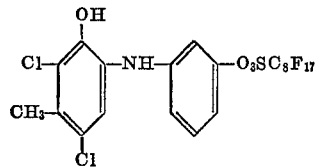

V 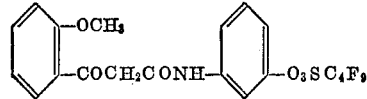

VI 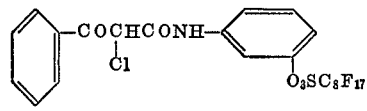

VII 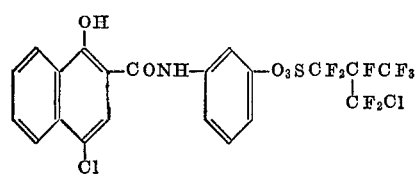

VIII 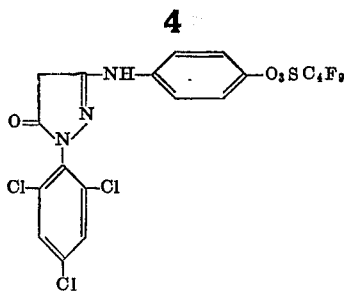

IX 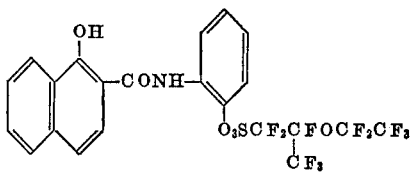

X 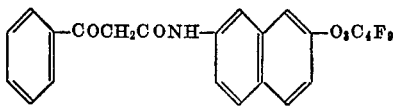

XI 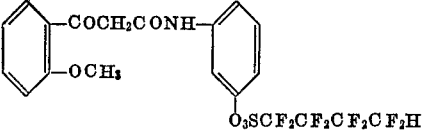

XII 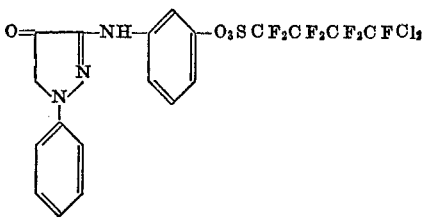

XIII 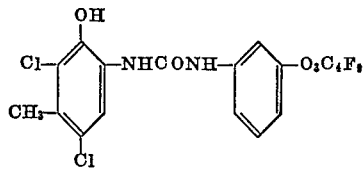

XIV 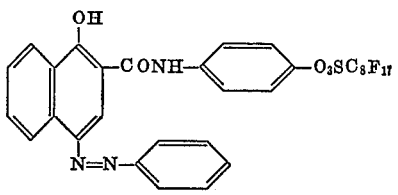

XV 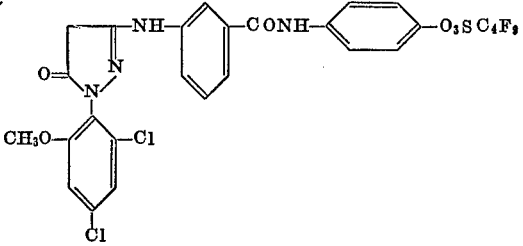

XVI

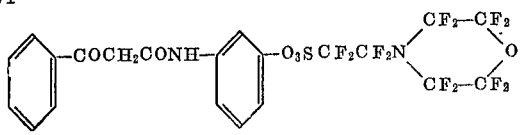

XVII

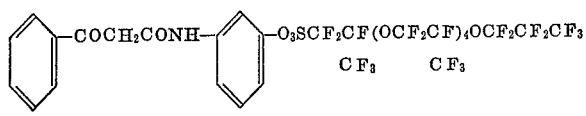

The invention may be more easily understood by reference to the following illustrative examples:

EXAMPLE 1

4'(2''-benzoylacetamido)phenyl perfluorobutanesulfonate

To a briskly stirred mixture of 14.8 g. p-nitrophenol, 5 ml. pyridine and 100 ml. triethylamine was slowly added 30 g. of perfluorobutanesulfonyl fluoride. The resulting two-phase mixture was poured into a mixture of 400 g. ice, 100 ml. water, and 75 ml. concentrated hydrochloric acid. The solid which formed was collected and washed with water, slurried successively with cold dilute sodium hydroxide, water, dilute acetic acid, and finally was washed again with water. Recrystallization from methanol yielded 20 g. of p-nitrophenyl perfluorobutanesulfonate benzene as a white solid which melted at 68–69° C. Eighteen grams of this compound were dissolved in a refluxing mixture of 200 ml. ethanol, 10 ml. water, and 50 ml. concentrated hydrochloric acid. Iron filings (20 g.) were added portionwise to the refluxing solution. After 3 hours the mixture was filtered and the filtrate was poured into cold dilute hydrochloric acid. A solid (p-aminophenyl perfluorobutanesulfonate) was collected.

To 6.7 g. of ethyl benzoylacetate dissolved in 50 ml. of xylene was added 8.6 g. of the so-prepared p-aminophenyl perfluorobutanesulfonate. About 40 ml. of the xylene was distilled, thereby removing the ethanol which was formed. The residue was cooled and the solid which formed was recrystallized successively from the methanol and toluene. The resulting yellow coupler compound melted at 147–148° C.

*Analysis.*—Calculated (percent): C, 42.5; H, 2.26; F, 31.8. Found (percent): C, 42.8; H, 2.5; F, 31.9.

EXAMPLE 2

3'(1''-hydroxy-2''-naphthamido)phenyl perfluorobutanesulfonate

Metaminophenol (21.8 g.), triethylamine (50.5 g.), and perfluorobutanesulfonyl fluoride (60.4 g.) were combined in flask and refluxed for 2 hours. After cooling to 20° C., a solution of 45 ml. concentrated hydrochloric acid in 300 ml. water was slowly added with good stirring. Two phases were formed. The mixture was then neutralized with aqueous potassium hydroxide and the phases were separated. The organic layer was washed with dilute aqueous potassium hydroxide and then dried to provide 3'-aminophenyl perfluorobutanesulfonate.

To 8.6 g. of the so-prepared 3'-aminophenyl perfluorobutanesulfonate dissolved in 100 ml. of decane was added 7.9 g. of phenyl 1-hydroxy-2-naphthoate. About 75 ml. of the decane was then distilled to remove the phenol which was formed. The residue was cooled and the resulting precipitate was washed with methanol and was recrystallized successively from toluene and acetonitrile to yield 7.3 g. of a white solid melting at 158° C.

*Analysis.*—Calculated (percent): C, 45.0; H, 2.2; F, 30.5. Found (percent): C, 45.0; H, 2.2; F, 30.5.

EXAMPLE 3

3'(2''-benzoylacetamido)phenyl perfluorobutanesulfonate

To 6.7 grams of ethyl benzoylacetate dissolved in 50 ml. of xylene was added 8.6 of the 3'-aminophenyl perfluorobutanesulfonate as prepared in Example 2. About 40 ml. of the xylene was distilled to remove the ethanol which was formed. The residue was cooled and the resulting solid was dissolved in heptane, filtered hot, and recovered by cooling the heptane solution. The resulting solid melted at 97–98° C.

EXAMPLE 4

3'(2''-benzoylacetamido)phenyl perfluorooctane sulfonate

This coupler was prepared by the method of Example 3 by reacting ethyl benzoylacetate with 3'-aminophenyl perfluorooctanesulfonate. The solid product melted at 103–106° C.

*Analysis.*—Calculated (percent): C, 37.5; H, 1.6; N, 1.9; F, 43.8. Found (percent): C, 37.1; H, 1.6; N, 2.0; F, 44.1.

EXAMPLE 5

To 150 grams of a medium speed gelatino silver bromide emulsion was added 43 g. of an aqueous gelatin dispersion containing 1.92 grams of the coupler of Example 3 in 4 g. of tricresylphosphate. The resulting mixture was coated on a subbed cellulose triacetate film and dried. The coating was exposed to light and was then developed in a primary aromatic amine developer having the following composition:

| | |
|---|---|
| Sodium carbonate | g.. 3.0 |
| Sodium sulfate | g.. 0.2 |
| Potassium bromide | g.. 0.25 |
| Ethylenediamine sulfate | g.. 0.60 |
| Sodium hydroxide | g.. 0.30 |
| Benzyl alcohol | ml.. 0.5 |
| Hydroxylamine hydrochloride | g.. 0.20 |
| N-ethyl-β-methanesulfonamidoethyl-3-methyl-4-aminoaniline sulfate | g.. 0.70 |
| Water to 100 ml. | |

Silver and silver halide were removed from the layer by treatment with a common ferricyanide bleach and with a sodium sulfite fixing solution, leaving a yellow dye in the layer. The optical density of the dye at the measured absorption peak of 454 mμ was 1.00.

EXAMPLE 6

Example 5 was repeated using various couplers of the invention and also using couplers containing hydrocarbonsulfonate rather than fluoroaliphaticsulfonate substituents. After exposure, one portion of each of the resulting films was developed in the developer of Example 5, bleached and fixed. Another portion of each film was first soaked for 30 minutes in the developer solution of Example 5 (minus developer) prior to development, bleaching and fixing. The respective diffusion resistance of the couplers is reflected by the change, if any, in optical density values due to soaking of the films. Optical density values are reported in the following table.

| Coupler | λmax., mμ | Optical density No soak | Developer presoak |
|---|---|---|---|
| (structure) | 454 | 1.00 | 1.11 |
| (structure) | 450 | 0.99 | 0.29 |
| (structure) | 444 | 0.59 | 0.41 |
| (structure) | 670 | 1.48 | 1.33 |
| (structure) | 690 | 1.28 | 0.53 |
| (structure) | 446 | 0.83 | 0.78 |
| (structure) | 447 | 0.92 | 0.90 |

EXAMPLE 7

Couplers of the formulae (A) 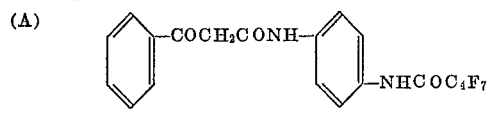

and (B) 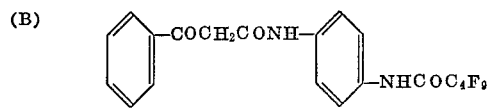

were prepared in accordance with U.S. Pat. 2,895,826 by reacting N(p-aminophenyl)perfluoropropionamide and N(p-aminophenyl)perfluorobutamide ethyl benzoylacetate in xylene solvent.

The diffusion resistance of these couplers in gelatino silver halide photographic layers was compared with the resistance to diffusion of the coupler of Example 3, as follows.

Each coupler (3 g.) was dissolved respectively in a solution composed of 500 ml. of methanol and 500 ml. of isopropyl alcohol. Each of the resulting three solutions was then mixed, at a volume ratio of 2:1, with a developer solution having the following composition:

| | G. |
|---|---|
| 2-amino-5-diethylaminotoluene sulfate | 2.5 |
| Sodium sulfite (anhydrous) | 5.0 |
| Sodium carbonate (anhydrous) | 20.0 |
| Potassium bromide | 2.0 |
| Water to 1000 cc. | |

Identical strips of film bearing an exposed gelatino silver halide emulsion layer upon a clear film support were allowed to develop in each of the coupler-developer solutions for four minutes, and were then treated consecutively in photographic shortstop (acetic acid type), bleach (ferricyanide type), wash (water) and fix (sodium thiosulfate type) baths for 3 minutes each and were subsequently washed with water for five minutes.

Each of the film strips was then visually inspected through the film support to determine if sufficient diffusion had occurred to afford dye formation in that portion of the emulsion layer adjacent the film support. Considerable dye formation adjacent the support was found in each of the film strips which had been treated with couplers (A) and (B) above, whereas no such dye formation was observed in the film strip treated with the dye of Example 3.

What I claim is:

1. A silver halide photographic emulsion which contains a coupler of the formula

R—X wherein R is a phenolic, 1-naphtholic, 5-pyrazolone or benzoylacetamide coupler radical which includes at least one aromatic ring and an active coupling function such that the compound R—H is reactive with an oxidation product of a primary aromatic amine developer to form a dye, and X is a fluoroaliphaticsulfonyloxy group, the fluoroaliphatic radical of which is a fluorinated, saturated, monovalent, non-aromatic radical which has at least three carbon atoms, said fluoroaliphaticsulfonyloxy group being bonded to an annular carbon atom of an aromatic ring of said R radical in a non-coupling position.

2. A photographic element which includes a layer comprising the photographic emulsion of claim 1.

3. The emulsion of claim 1 wherein said fluoroaliphatic radical of said coupler contains a terminal perfluoromethyl group.

4. The emulsion of claim 1 wherein said fluoroaliphatic radical is fully fluorinated.

5. The emulsion of claim 1 wherein the ratio of substituent atoms to carbon atoms on said fluoroaliphatic radical does not exceed 1:2.

6. The emulsion of claim 1 wherein said fluoroaliphatic radical is a $C_4$-$C_8$ perfluoroalkyl radical.

7. The emulsion of claim 1 wherein said organic coupler radical is a benzoylacetamidophenyl radical.

8. A silver halide photographic emulsion which contains a coupler of the formula $$R—X$$

wherein R is a phenolic, 1-naphtholic, 5-pyrazolone or benzoylacetamide coupler radical which includes an arylamino radical and an active coupling function such that the compound R—H is reactive with an oxidation product of a primary aromatic amine developer to form a dye, and X is a fluoroaliphaticsulfonyloxy group, the fluoroaliphatic radical of which is a fluorinated, saturated, monovalent, non-aromatic radical which has at least three carbon atoms, said fluoroaliphaticsulfonyloxy group being bonded to an annular carbon atom of said arylamino radical of said R radical in a non-coupling position.

References Cited
UNITED STATES PATENTS

| | | | |
|---|---|---|---|
| 2,289,805 | 7/1942 | Porter et al. | 96—100 |
| 2,895,826 | 7/1959 | Salminen et al. | 96—100 |
| 3,462,270 | 8/1969 | Eynde et al. | 96—100 |

J. TRAVIS BROWN, Primary Examiner

U.S. Cl. X.R.

96—55

UNITED STATES PATENT OFFICE
CERTIFICATE OF CORRECTION

Patent No. 3,681,076   Dated August 1, 1972

Inventor(s) Ivan H. Skoog

It is certified that error appears in the above-identified patent and that said Letters Patent are hereby corrected as shown below:

Column 4, lines 15-20:

" 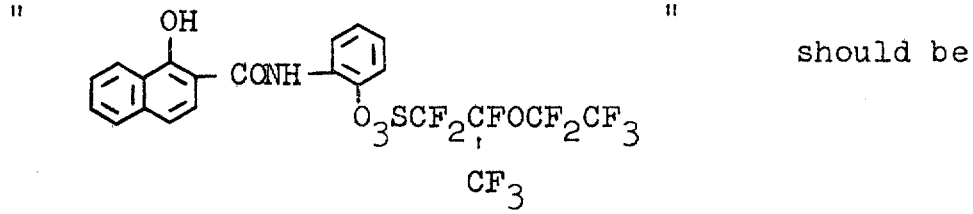   "   should be

-- 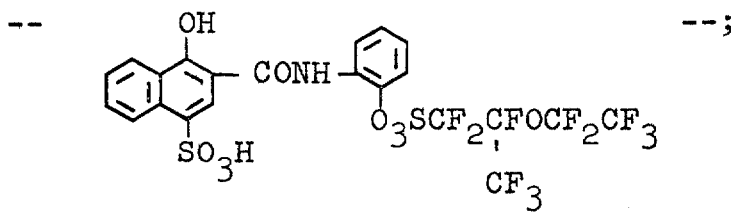   --;

Column 4, lines 35-40:

" 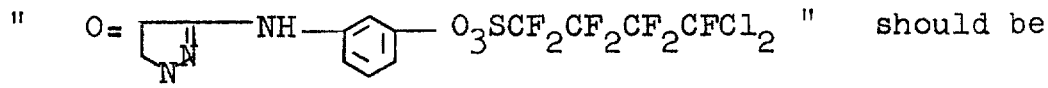   "   should be

-- 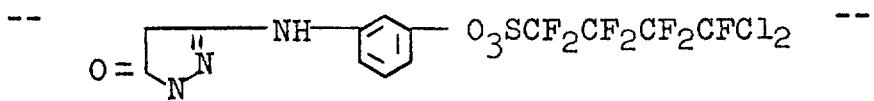   --

Signed and sealed this 29th day of May 1973.

(SEAL)
Attest:

EDWARD M. FLETCHER, JR.   ROBERT GOTTSCHALK
Attesting Officer   Commissioner of Patents